P. P. MARTIN.
Ore Washer.
No. 17,385. Patented May 26, 1857.
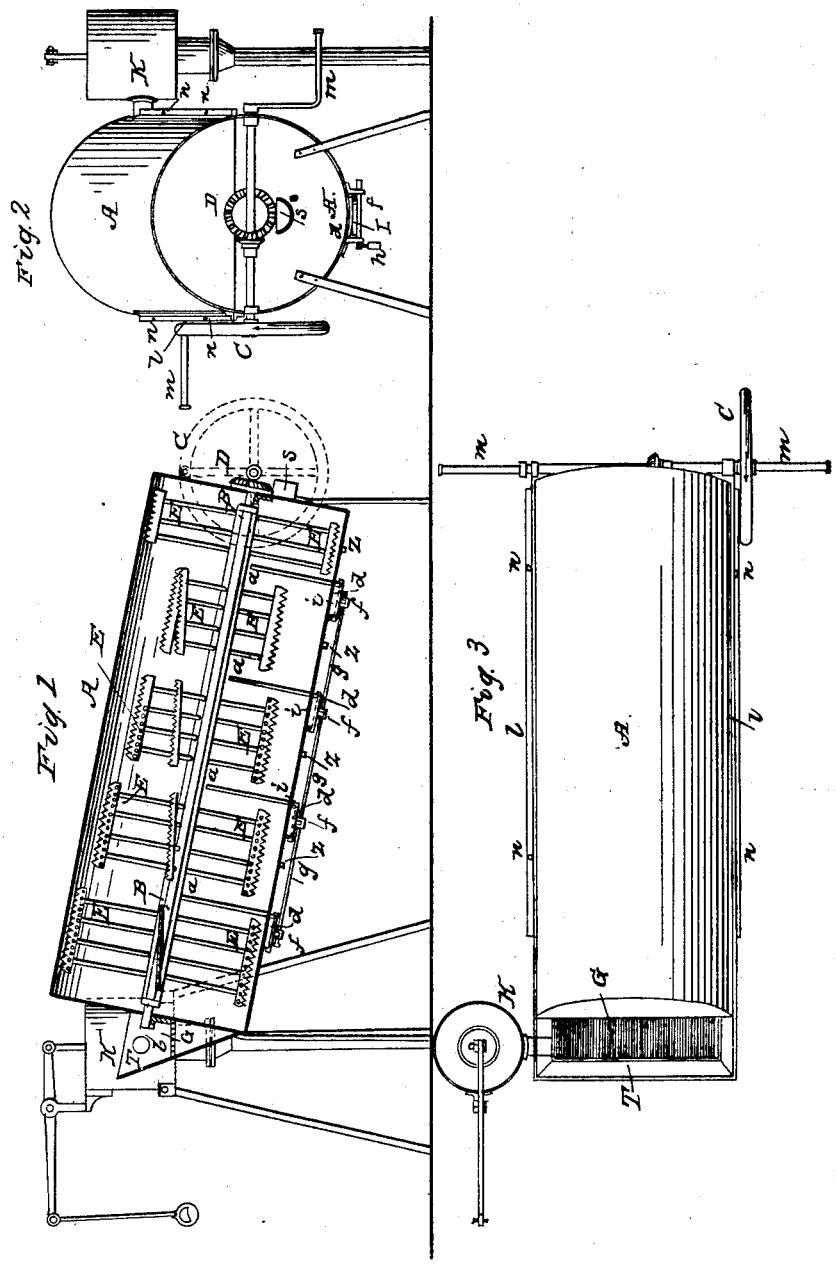

UNITED STATES PATENT OFFICE.

PIERRE P. MARTIN, OF PARIS, FRANCE.

ORE-WASHER.

Specification of Letters Patent No. 17,385, dated May 26, 1857.

*To all whom it may concern:*

Be it known that I, PIERRE PROSPER MARTIN, of 39 Rue de l'Echiquier, Paris, in the Empire of France, a subject of the Emperor of the French, have invented or discovered an Improved Apparatus for the Washing of Auriferous Earths, Sands, and Pulverized Quartz, and that the following is a full, clear, and exact description of the principle or character which distinguishes it from all other things before known and of the usual manner of making, modifying, and using the same.

The apparatus is composed of a cylinder A in sheet iron or wood, Figures 1, 2. This cylinder is inclined to a convenient extent, and divided into compartments in greater or less number according to circumstances by the partitions $a$. In its interior is an agitator B B revolving on its axes $b$, by means of the rackwork D of the winch $m$ and the fly-wheel C. This agitator is mounted in its length by a range of toothed paddles in hard metal, disposed in such a manner that one series of them enters each compartment. These paddles are set helically on the axis B of the agitator at such a pitch as may be found best adapted to the work. By this arrangement the rotatory movement of the agitator produced in working the winch $m$ causes the water and solid bodies to pass from one compartment to the other to the seclusion of the auriferous particles, till on reaching the last of the series the water runs off by the discharge orifice S at the lower end of the cylinder. At the lower part beside the stoppers, holes $z$ are pierced for stanching the compartments, when the work is finished.

Under the cylinder, and at the lower extremity of each compartment is a circular orifice I, furnished by a stopper $d$, secured by a key piece $f$. All these key pieces are stopped by a rod $g$ traversing them at the smaller end and secured in its turn by a padlock, as seen in Fig. 2.

The cylinder is mounted with a lid, which may be opened and closed at will. It may also be secured by means of bands $l$ placed on the hinges as shown in Figs. 2 and 3. These bands are traversed by bolts $n$ secured by padlocks and key. At the upper part of the cylinder is mounted a hopper T with a grating G for the reception of the matter to be operated on. The apparatus is completed by a handpump K, by which water is passed to the hopper for the purpose of carrying the materials to the cylinder, when they are washed as shown at Figs. 1 and 3.

The whole in short constitutes a closed apparatus with rotating agitator and a system of separating compartments, and is distinguished from the apparatus at present known by its lightness, its power, and the entire absence of parts, liable to friction or necessitating repairs. And having now described the nature of my said invention and the manner of executing the same, I wish it to be understood, that I do not claim any one of the component parts taken separately. But

What I claim is—

The general arrangement of the apparatus as above described and represented in the figures of the annexed drawing

P. P. MARTIN.

Witnesses:
 J. W. B. MENNONS,
 H. M. GENTAMEMOREAU.